(12) United States Patent
Gramme et al.

(10) Patent No.: US 7,490,671 B2
(45) Date of Patent: Feb. 17, 2009

(54) PIPE SEPARATOR WITH IMPROVED SEPARATION

(75) Inventors: Per Gramme, Porsgrunn (NO); Gunnar Hannibal Lie, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 145 days.

(21) Appl. No.: 10/563,291

(22) PCT Filed: Jul. 8, 2004

(86) PCT No.: PCT/NO2004/000211

§ 371 (c)(1),
(2), (4) Date: Jun. 1, 2006

(87) PCT Pub. No.: WO2005/005777

PCT Pub. Date: Jan. 20, 2005

(65) Prior Publication Data
US 2007/0102369 A1 May 10, 2007

(30) Foreign Application Priority Data

Jul. 9, 2003 (NO) ................................. 20033153

(51) Int. Cl.
*E21B 29/12* (2006.01)
(52) U.S. Cl. .................. 166/357; 166/267; 210/248; 96/55
(58) Field of Classification Search .......... 166/351, 166/357, 368, 366, 267; 210/248; 96/55
See application file for complete search history.

(56) References Cited

U.S. PATENT DOCUMENTS

| 3,766,050 | A | | 10/1973 | Pados | |
|---|---|---|---|---|---|
| 4,601,834 | A | * | 7/1986 | Bailes et al. | 210/748 |
| 5,149,344 | A | * | 9/1992 | Macy | 96/159 |
| 5,232,475 | A | * | 8/1993 | Jepson | 95/260 |
| 5,868,939 | A | * | 2/1999 | Oder et al. | 210/695 |
| 6,059,039 | A | * | 5/2000 | Bednar et al. | 166/344 |
| 6,136,174 | A | * | 10/2000 | Berry et al. | 204/671 |
| 6,811,693 | B2 | * | 11/2004 | Nilsen et al. | 210/243 |
| 6,872,239 | B2 | * | 3/2005 | Nilsen et al. | 95/30 |
| 2003/0146175 | A1 | * | 8/2003 | Nilsen et al. | 210/788 |

FOREIGN PATENT DOCUMENTS

| GB | 2047735 A | * | 12/1980 |
|---|---|---|---|
| WO | WO 01/00296 | * | 1/2001 |
| WO | 01/85297 | | 11/2001 |
| WO | 02/089947 | | 11/2002 |
| WO | 2004/016907 | | 2/2004 |
| WO | WO 2005005777 A1 | * | 1/2005 |

\* cited by examiner

*Primary Examiner*—Thomas A Beach
(74) *Attorney, Agent, or Firm*—Wenderoth, Lind & Ponack, L.L.P.

(57) ABSTRACT

A pipe separator is for separation of fluids, for example separation of oil, gas and water in connection with extraction and production of oil and gas from formations under a sea bed. The pipe separator comprises an extended, tubular separator body having a diameter at inlet and outlet ends that is mainly equal to or slightly greater than a diameter of a transport pipe to which the separator body is connected. A cyclone is arranged upstream of the separator body for separation of any gas present. An electrostatic coalescer is incorporated in and constitutes an integrated part of the separator body.

16 Claims, 2 Drawing Sheets

PIPE SEPARATOR WITH IMPROVED SEPARATION

The present invention concerns a pipe separator for separation of fluids, for example separation of oil, gas and water in connection with extraction and production of oil and gas from formations under a sea bed, comprising an extended, tubular separator body that has a diameter at inlet and outlet ends that is mainly equivalent to a diameter of a transport pipe to which the pipe separator is connected, a cyclone arranged upstream of the separator body for separation of any gas present, and an electrostatic coalescer arranged in connection with the pipe separator.

Applicant's own Norwegian Patent Application Nos. 19994244, 20015048, 20016216, 20020619 and 20023919 describe prior art pipe separators for separation of oil, water and/or gas downhole, on a sea bed or on a surface, on a platform or similar. In particular, Patent Application No. 20023919 shows a solution in which a separate, compact electrostatic coalescer is used in connection with a pipe separator. Oil flow from the pipe separator is passed to the coalescer downstream of the pipe separator and subsequently to a further oil/water separator that removes remaining water after separation in the pipe separator. This prior art solution is particularly designed for, but not limited to, medium heavy oils with water removal from an oil phase to 0.5% water, and using a cyclone or other type of gas/liquid separator to remove gas before the pipe separator.

This solution requires an additional separator, which is complicated and expensive, and the coalescer itself, which is of a vertical type, cannot be reamed or pigged (cleaned) in a conventional manner. This also represents a considerable disadvantage of the prior art solution.

The present invention represents a considerably simplified separation solution in which the above disadvantages are avoided. The present invention is characterized in that an electrostatic coalescer is incorporated in and constitutes an integrated part of a separator body.

The present invention will be described in further detail in the following with reference to attached drawings, where:

DETAILED DESCRIPTION OF THE PREFERRED EMBODIMENTS

Figure 1:
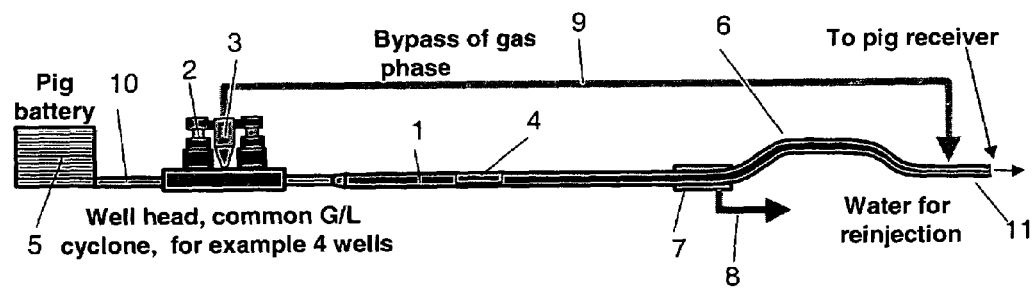
FIG. 1 shows an elementary sketch of a pipe separator in accordance with the present invention.

A solution shown in FIG. 1 is a separator that comprises a tubular separator body 1, a liquid seal 6, arranged downstream of the separator body, for a water phase in fluid (oil/water) that flows through the separator, a drainage device 7 with an outlet 8 for separated water, a pig battery 5, arranged upstream of the separator body in connection with a well head 9, a connection pipe 10 that connects the well head to the separator body 1, and a transport pipe 11 for oil downstream of the separator body. A special feature of the present invention is that a coalescer 4 is incorporated in the separator body 1 as an integrated unit. The coalescer is expediently arranged at a distance of between ⅓ and ½ of a length of the separator body from an inlet of the separator body. However, its location is not limited to this.

Figure 2:
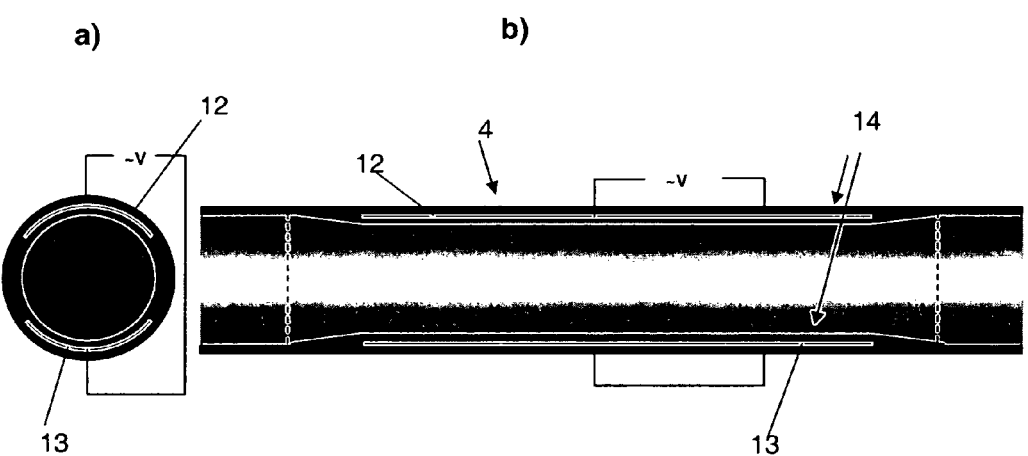
FIG. 2 shows an enlarged part of the separator shown in FIG. 1 in an area of a coalescer in a cross-section a) and a longitudinal section b).

FIG. 2 shows in large scale, in cross-section and longitudinal section, a part of the separator body in which the coalescer is incorporated. As this figure shows, the coalescer comprises an upper electrode 12 and a lower electrode 13 that are enclosed in expediently insulating material in a wall 14 of the separator body. The electrodes are designed to have applied thereto (not shown in further detail) an expedient voltage "V" (AC voltage) to create an electric field that contributes to increasing separation of water from fluid (oil and water) flowing through the separator. As FIG. 1 shows, a cyclone 3 (or another expedient gas/liquid separator) is arranged upstream of the separator body 1 to remove any gas from fluid that is produced in the well head 9. An intention of removing gas is to prevent the gas from reducing an effect of the coalescer, as the gas is a poor electrical conductor. Another intention is to prevent formation of plug flow in the separator.

A method of operation of a separator solution in accordance with the present invention is otherwise as follows:

Fluid, i.e. gas, oil and water, that is produced is passed first to the cyclone 3, where a majority of gas is removed and passed on in a separate pipe 9, possibly being reintroduced into the transport pipe 11 after the separator body 1.

A liquid phase, which may contain small amounts of gas, is introduced into the separator body 1. Free water will separate quickly and form a water phase under an oil phase. Gas bubbles will collect in a top of the separator pipe and, depending on their concentration, form a free gas phase. When coarse separation has been completed (i.e. the water phase on a bottom, the oil phase with small oil drops in a center, and possibly a thin gas phase on a top), the fluid will pass into integrated coalescer 4.

In the coalescer 4, a voltage drop will be created mainly over an oil zone because a water zone conducts current and a gas zone also has good conduction properties. The voltage drop over the oil zone (alternating current) produces an increased drop in coalescence and destabilizes an oil/water interface. Water drops grow in size and will separate quickly after the fluid has entered the separator body 1 again.

In the separator body downstream of the coalescer, coalesced water drops will be separated out and collected in the collection unit 7, where water is drained out via the pipe 8. Oil will flow on past the water seal 6 to the transport pipe 11.

The present invention as it is defined in the claims is not limited to the example shown and described above. The separator may be provided with two or more coalescers 4 arranged in series in the separator body 1. This may be particularly relevant for oils that are difficult to separate such as heavier oils.

The cyclone 3 may also be located in places other than the well head as shown in FIG. 1. It has proved expedient for the cyclone to be located in connection with equipment that causes high shear for fluid, as this produces good separation conditions. However, it may also be relevant to locate the cyclone in close proximity to the separator's inlet in situations in which the separator is located far from the well head.

The invention claimed is:

1. A pipe separator for separation of oil, gas and water in connection with extraction and production of oil and gas from formations under a sea bed, comprising:
    an extended, tubular separator body having a diameter at inlet and outlet ends that is mainly equal to or slightly greater than a diameter of a transport pipe to which said separator body is connected;
    a separator device upstream of said separator body for separation of gas; and an electrostatic coalescer incorporated in and constituting an integrated part of said separator body, said electrostatic coalescer including an upper electrode and a lower electrode in a wall of said separator body such that said upper and lower electrodes are to be supplied with an electric voltage so as to establish a vertical electric field within said separator body.

2. The pipe separator according to claim 1, wherein said separator device comprises a cyclone separator.

3. The pipe separator according to claim 2, further comprising:
   a water seal downstream of said separator body; and
   a device in communication with said water seal for drainage of water that is separated out in said separator body.

4. The pipe separator according to claim 3, further comprising:
   another electrostatic coalescer arranged in series with said electrostatic coalescer.

5. The pipe separator according to claim 3, wherein said cyclone separator is in communication with a throttle valve that produces high shear for fluid.

6. The pipe separator according to claim 3, wherein said cyclone separator is in close proximity to the inlet end of said separator body.

7. The pipe separator according to claim 2, further comprising:
   another electrostatic coalescer arranged in series with said electrostatic coalescer.

8. The pipe separator according to claim 2, wherein said cyclone separator is in communication with a throttle valve that produces high shear for fluid.

9. The pipe separator according to claim 2, wherein said cyclone separator is in close proximity to the inlet end of said separator body.

10. The pipe separator according to claim 1, further comprising:
    a water seal downstream of said separator body; and
    a device in communication with said water seal for drainage of water that is separated out in said separator body.

11. The pipe separator according to claim 10, further comprising:
    another electrostatic coalescer arranged in series with said electrostatic coalescer.

12. The pipe separator according to claim 10, wherein said separator device is in communication with a throttle valve that produces high shear for fluid.

13. The pipe separator according to claim 10, wherein said separator device is in close proximity to the inlet end of said separator body.

14. The pipe separator according to claim 1, further comprising:
    another electrostatic coalescer arranged in series with said electrostatic coalescer.

15. The pipe separator according to claim 1, wherein said separator device is in communication with a throttle valve that produces high shear for fluid.

16. The pipe separator according to claim 1, wherein said separator device is in close proximity to the inlet end of said separator body.

* * * * *